US011960152B2

(12) United States Patent
Hirabayashi et al.

(10) Patent No.: US 11,960,152 B2
(45) Date of Patent: Apr. 16, 2024

(54) METHOD FOR ADJUSTING TRANSMITTED WAVELENGTH OF SIGNAL LIGHT TRANSMITTED THROUGH OPTICAL WAVEGUIDE DEVICE

(71) Applicant: Nippon Telegraph and Telephone Corporation, Tokyo (JP)

(72) Inventors: Katsuhiko Hirabayashi, Musashino (JP); Nobutatsu Koshobu, Musashino (JP); Satomi Katayose, Musashino (JP); Ryoichi Kasahara, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 537 days.

(21) Appl. No.: 17/262,865

(22) PCT Filed: Jul. 26, 2019

(86) PCT No.: PCT/JP2019/029416
§ 371 (c)(1),
(2) Date: Jan. 25, 2021

(87) PCT Pub. No.: WO2020/031751
PCT Pub. Date: Feb. 13, 2020

(65) Prior Publication Data
US 2021/0240015 A1 Aug. 5, 2021

(30) Foreign Application Priority Data

Aug. 9, 2018 (JP) .................................. 2018-150460

(51) Int. Cl.
*G02F 1/01* (2006.01)
*G02F 1/035* (2006.01)
*G02F 1/295* (2006.01)

(52) U.S. Cl.
CPC ............ *G02F 1/0126* (2013.01); *G02F 1/011* (2013.01); *G02F 2203/11* (2013.01)

(58) Field of Classification Search
CPC .... G02F 1/0126; G02F 1/011; G02F 2203/11; G02B 6/12; G02B 6/125
(Continued)

(56) References Cited

U.S. PATENT DOCUMENTS 5,799,118 A * 8/1998 Ogusu ................ G02B 6/12007
385/14
6,909,732 B2 * 6/2005 Imajuku ................... G01J 9/00
372/32
(Continued)

FOREIGN PATENT DOCUMENTS

JP H07-156547 A 6/1995
JP H10-186151 A 7/1998
(Continued)

*Primary Examiner* — Kaveh C Kianni
*Assistant Examiner* — Hung Q Lam
(74) *Attorney, Agent, or Firm* — Workman Nydegger

(57) ABSTRACT

A method for adjusting a transmission wavelength of signal light transmitted through an optical waveguide device provided with one or more optical waveguides through which the signal light having a wavelength of 1520 nm to 1560 nm and blue light having a wavelength of 375 nm to 455 nm pass, a groove through which the waveguide passes, and resin filled in the groove, including a step of passing the signal light and the blue light through the same or mutually different one or more optical waveguides and of passing the signal light and the blue light through the same or mutually different resin, the latter step changing a refractive index of the resin by irradiating the resin with the blue light so as to change the transmission wavelength of the signal light transmitted through the resin in accordance with a change in the refractive index of the resin.

8 Claims, 11 Drawing Sheets

(58) Field of Classification Search
USPC .......................................... 385/1–2, 8, 10, 37
See application file for complete search history.

(56) References Cited

U.S. PATENT DOCUMENTS

| | | | |
|---|---|---|---|
| 8,873,910 B2* | 10/2014 | Bulthuis | G02B 6/12028 |
| | | | 385/27 |
| 2006/0198579 A1* | 9/2006 | Bulthuis | G02B 6/12028 |
| | | | 385/37 |
| 2008/0203901 A1* | 8/2008 | Bukesov | C09K 11/77747 |
| | | | 252/301.36 |
| 2011/0317727 A1* | 12/2011 | Furuya | H01S 3/109 |
| | | | 372/27 |

FOREIGN PATENT DOCUMENTS

| | | |
|---|---|---|
| JP | 2001-154043 A | 6/2001 |
| JP | 2003-523528 A | 8/2003 |
| JP | 2012-14151 A | 1/2012 |
| WO | 2010/079761 A1 | 7/2010 |

* cited by examiner

METHOD FOR ADJUSTING TRANSMITTED WAVELENGTH OF SIGNAL LIGHT TRANSMITTED THROUGH OPTICAL WAVEGUIDE DEVICE

TECHNICAL FIELD

The present invention relates to a method for adjusting a transmission wavelength of signal light transmitted through an optical waveguide device, and specifically, a method for adjusting a transmission wavelength of signal light by irradiating, with blue light having a wavelength of 375 nm to 455 nm, only resin through which an optical waveguide in the optical waveguide device passes so as to change a refractive index of the resin.

BACKGROUND ART

In the field of optical communication, a wavelength division multiplexing method is used in which a plurality of signals are respectively superimposed on different wavelengths in order to increase information capacity, and are then transmitted in a single optical fiber. In this method, as an optical wavelength multi/demultiplexer for multiplexing and demultiplexing lights having different wavelengths, an athermal arrayed waveguide grating (hereinafter, referred to as the athermal AWG) plays an important role.

The optical wavelength multi/demultiplexer has a problem that a wavelength of a light transmitted through the optical wavelength multi/demultiplexer greatly fluctuates as the temperature changes due to a temperature dependency of the refractive index that a quartz glass inside the optical wavelength multi/demultiplexer has as well as due to thermal expansion of the quartz glass itself. Conventionally, to solve this problem, the temperature of the quartz glass is kept constant by heating with a heater or the like, or a groove is provided on the inner surface of a slab waveguide made of a quartz glass and the inside of the groove is filled with a resin such as a polymer whose temperature dependency of the refractive index is different from that of the quartz glass, that is, offset in the temperature dependency of the refractive index is made by the entire configuration of the optical wavelength multi/demultiplexer. In this way, the optical wavelength multi/demultiplexer is made independent from the temperature such that the wavelength of the light transmitted through the optical wavelength multi/demultiplexer does not fluctuate even when the temperature changes. In this regard, establishing temperature independence is called athermal or athermalization.

Further, the wavelength demultiplexed by the AWG often generates a deviation from the standard wavelengths internationally standardized and recommended by the International Telecommunication Union (ITU) due to manufacturing fluctuation of an optical circuit that occurs in the manufacturing process. Conventionally, for eliminating the deviation of the demultiplexed wavelength generated in the manufacturing process, a method is used in which the refractive index of an optical waveguide made of a quartz that constitutes the AWG is changed by irradiating the manufactured AWG with a high-power ultraviolet laser emitted from an excimer laser while monitoring the wavelength of the ultraviolet laser so as to trim the wavelength demultiplexed by the AWG (Patent Literature 1).

Further, in the athermal AWG, a method has also been proposed in which, by irradiating a polymer filled in a triangular groove formed in an optical path, the refractive index of the polymer is changed so as to trim the wavelength demultiplexed by the athermal AWG (Patent literature 2).

Further, the spectral shape of the transmitted light of the AWG is usually a Gaussian shape. Thus, in order to improve the tolerance to the wavelength of a light source and to provide the tolerance to temperature, a device configuration has been proposed to flatten the tip of the spectral shape of the transmitted light of the AWG. That is, a device configuration has been proposed in which a Mach-Zehnder interferometer (hereinafter, referred to as the MZI) is connected to a slab waveguide provided at an input side of the AWG. At this time, as the MZI itself needs to be athermalized as in the case of the AWG, grooves are provided in the waveguides on a short arm side and on a long arm side of the MZI, and resin is filled in the grooves for adjusting the refractive index (Patent literature 3).

CITATION LIST

Patent Literature

Patent Literature 1: Japanese Patent Laid-Open No. 2001-154043
Patent Literature 2: Japanese Translation of PCT International Application Publication No. 2003-523528
Patent Literature 3: International Publication No. WO 2010/079761
Patent Literature 4: Japanese Patent Laid-Open No. 2012-14151

SUMMARY OF THE INVENTION

Technical Problem

In the above case, the tip of the spectral shape of the transmitted light cannot be flatten unless the phases of the MZI are matched with an accuracy of about ±0.005 radians. Therefore, in order to adjust the phase of the MZI, it is also necessary to irradiate the waveguide of the MZI with an ultraviolet light and change the refractive index of the waveguide so as to trim the phase (Patent literature 3). In other words, in order to combine the MZI with the AWG to make the entire structure athermal, the number of process steps increases, causing a problem.

Further, a method has also been proposed in which the wavelength of the transmitted light is optimally adjusted by mixing two resins each having the refractive index different from each other, which have the same basic skeleton structure but have different types of side chains, and using the resultant mixture as a material to be filled into the groove of the waveguide of the athermal AWG (Patent literature 4). This adjustment method requires work to mix resins for adjusting the refractive index individually for each chip, and has a problem of a large work amount that results in complication.

Still further, in the optical waveguide devices such as the AWG and the MZI, in a case of irradiating a quartz glass that is an optical waveguide with an ultraviolet light to adjust the refractive index, a large-sized and high-power output ultraviolet light source such as an excimer laser is required. Similarly, in a case of irradiating a resin that is a material to fill in a groove provided in the optical waveguide with an ultraviolet light to adjust the refractive index thereof, an ultraviolet lamp having a high-power output is also required. In both cases, there is a problem in terms of cost.

Means for Solving the Problem

The present invention has been made to solve the above problems. One embodiment of the present invention is a method for adjusting a transmission wavelength of signal light transmitted through an optical waveguide device that is provided with one or more optical waveguides through which signal light having a wavelength of 1520 nm to 1560 nm and blue light having a wavelength of 375 nm to 455 nm pass, a groove through which the optical waveguide passes, and resin filled in the groove.

More specifically, one embodiment of the present provides a method for adjusting a transmission wavelength of signal light transmitted through an optical waveguide device, which includes a step of passing the signal light and the blue light through the same or mutually different one or more optical waveguides and of passing the signal light and the blue light through the same or mutually different resin, and the step of passing the signal light and the blue light through the resin is a step of changing a refractive index of the resin by irradiating the resin with the blue light so as to change the transmission wavelength of the signal light transmitted through the resin in accordance with a change in the refractive index of the resin.

Effects of the Invention

The present invention has been made in order to simplify a process of irradiating an entire optical waveguide device with an ultraviolet light which is required when a transmission wavelength or a waveform of the optical waveguide device such as an AWG, an MZI, or a ring resonator is trimmed. By passing, via the optical waveguide, blue light having a wavelength of 375 nm to 455 nm emitted from a semiconductor LD with an output of low power (1 to several tens of mW) through only a resin portion through which signal light for communication passes, the refractive index of the resin portion is adjusted.

According to the present invention, as a diameter of the optical waveguide through which the signal light passes is as small as about 10 lam, the power density is high even when the blue light is outputted with a low power. As a result, the refractive index of the resin portion can be efficiently adjusted without using a large-sized and high-power output excimer laser or UV lamp.

Further, according to the present invention, there is an advantage that the wavelength can be adjusted or readjusted after an optical circuit provided with the optical waveguide device is packaged as a module with a fiber, or even when a deviation is generated in the wavelength of the transmitted light as a result of aging after light is continuously passed through the optical waveguide device in the state of being packaged described above.

Still further, according to the present invention, the wavelength of the transmitted light can be adjusted by inputting blue light and signal light simultaneously to the optical waveguide device via a coupler and by adjusting the refractive index of the optical waveguide and/or the resin portion while monitoring the wavelength of the transmitted light. Thus, the wavelength of the transmitted light can be adjusted with a high accuracy of a 1 pm level.

DESCRIPTION OF EMBODIMENTS

Figure 1:
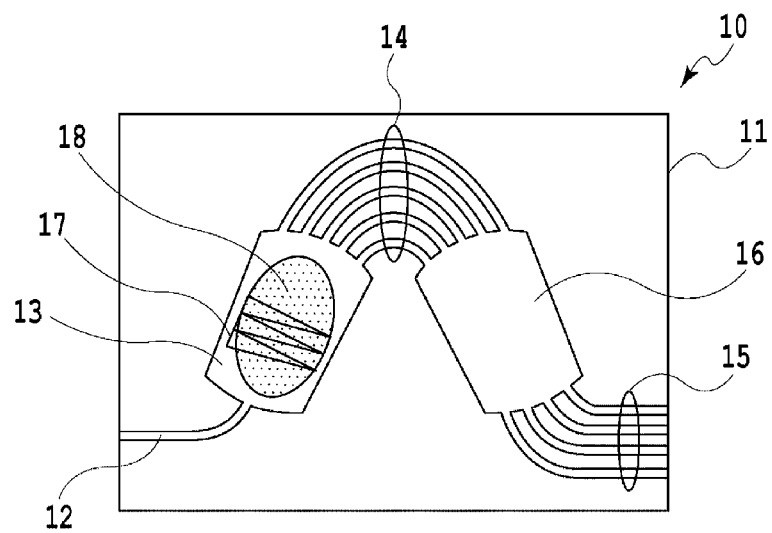
FIG. 1(a) is a schematic diagram showing a configuration of an athermal AWG.
FIG. 1(b) is a graph showing a transmission spectrum of signal light transmitted through the athermal AWG.
Figure 1:
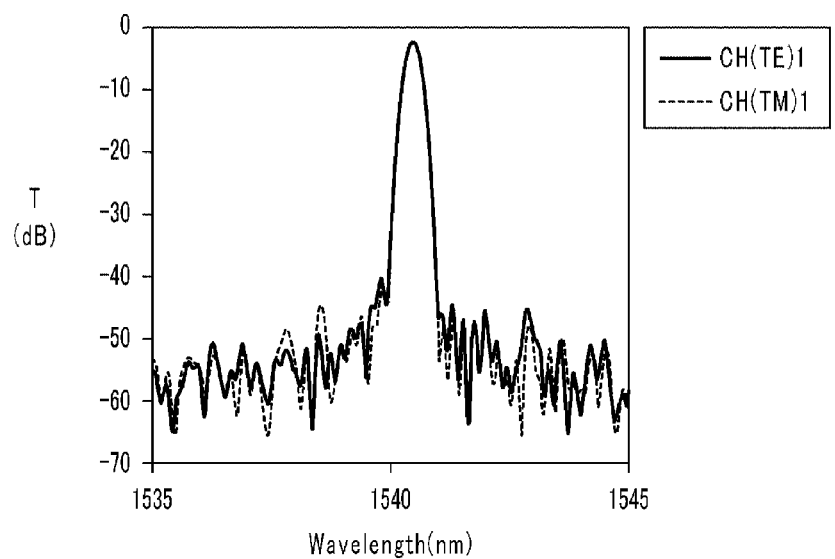

Hereinafter, embodiments of the present invention will be described in detail. Note that the embodiments of the present invention are not limited to the following examples at all without departing from the scope of the gist of the present invention.

First, an optical waveguide device used in an embodiment of the present invention will be described in the following (1) to (4).

(1) Athermal AWG

FIG. 1(a) is a schematic diagram showing a configuration of an athermal AWG, and FIG. 1(b) is a graph showing a transmission spectrum of signal light transmitted through the athermal AWG. The horizontal axis of the graph in FIG. 1(b) represents a wavelength, and the vertical axis thereof represents a transmittance. The solid line in the graph of FIG. 1(b) represents the transmittance of a horizontally polarized wave component, and the dotted line represents the transmittance of a vertically polarized wave component.

An athermal AWG 10 includes, on a quartz substrate 11, an input channel waveguide 12, an input side slab waveguide 13, a phase shift channel waveguide 14, an output side slab waveguide 16, an output channel waveguide 15, a groove 17, and resin 18. The configuration including these elements is the one-chip athermal AWG 10.

The input channel waveguide 12 is provided for inputting light to the athermal AWG 10, and is a single optical waveguide. The phase shift channel waveguide 14 and the output channel waveguide 15 are formed of a plurality of waveguides. Light input from the input channel waveguide 12 passes through the input side slab waveguide 13, the phase shift channel waveguide 14, and the output side slab waveguide 16 in this order, which are each optically connected, and demultiplexed light is output from the output channel waveguide 15.

In addition to the above components of the general AWG, the athermal AWG 10 is further provided with a groove 17 on the input side slab waveguide 13 for athermalization, and an interior of the groove 17 is filled with resin 18. Although the groove 17 is formed on the input side slab waveguide 13 in the configuration of the athermal AWG 10 shown in FIG. 1(a), the groove 17 may be formed on the output side slab waveguide 16 or may be formed on the phase shift channel waveguide 14. Further, in terms of the shape, the groove 17 is a triangular groove or a crescent groove, and a plurality of grooves 17 are preferably provided.

The resin 18 is optical resin, and silicone resin or acrylic resin can be employed. Further, for the resin 18, as long as it is a material whose refractive index can be changed by irradiation of light having a wavelength of 375 nm to 455 nm, any organic material can be employed without any particular limitation such as polyethylene, ethylene-vinyl acetate copolymer, ethylene-acrylate copolymer, polyisobutylene, ethylene-propylene rubber, chlorosulfonated polyethylene rubber, chlorinated polyethylene rubber, polypropylene, polybutadiene rubber, styrene-butadiene block rubber, styrene polyolefin rubber, fluorinated gel, fluororubber, or the like.

A center transmission wavelength $\lambda_C$ in the athermal AWG 10 is given by the following formula, where $n_c$ represents a refractive index of a core, $n_{Polymer}$ represents a refractive index of the resin, $\Delta L$ represents an optical path length difference between adjacent waveguides in the phase shift waveguide, $\Delta L_{Polymer}$ represents an optical path length difference between adjacent waveguides in the groove 17 filled with the resin 18, and m represents an diffraction order.

$$\lambda_c = \frac{n_c \cdot \Delta L + n_{polymer} \cdot \Delta L_{polymer}}{m} \quad \text{Formula 1}$$

In the configuration of the athermal AWG in a general optical communication wavelength band, when a wavelength of the signal light to be input is 1.55 μm, as the frequency characteristic of the signal light transmitted through the athermal AWG, one spectrum appears in the wavelengths of 1520 nm to 1560 nm. At this time, m=34. $\Delta L$ and $\Delta L_{polymer}$ are slightly different for each chip due to design fluctuation that occurs in the manufacturing process. For this reason, a deviation of up to several hundred pm is generated in the wavelength with respect to the ITU grid.

Here, the ITU grid is defined as wavelengths having wavelength intervals conforming to the ITU-TG. 691 recommendation.

The athermal AWG used for optical communication needs to have its transmission wavelength exactly matched to the ITU grid, and the matching accuracy needs to be at a level of 10 pm. The athermal AWG 10 can adjust the transmission wavelength by changing the refractive index of the resin 18 through which the signal light passes.

(2) Athermal MZI

Figure 2:
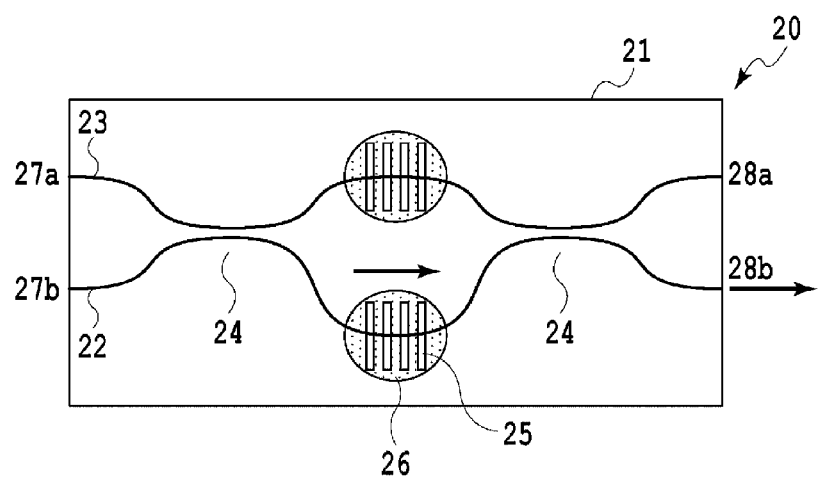
FIG. 2(a) is a schematic diagram showing a configuration of an athermal MZI.
FIG. 2(b) is a graph showing a transmission spectrum of signal light transmitted through the athermal MZI.
Figure 2:
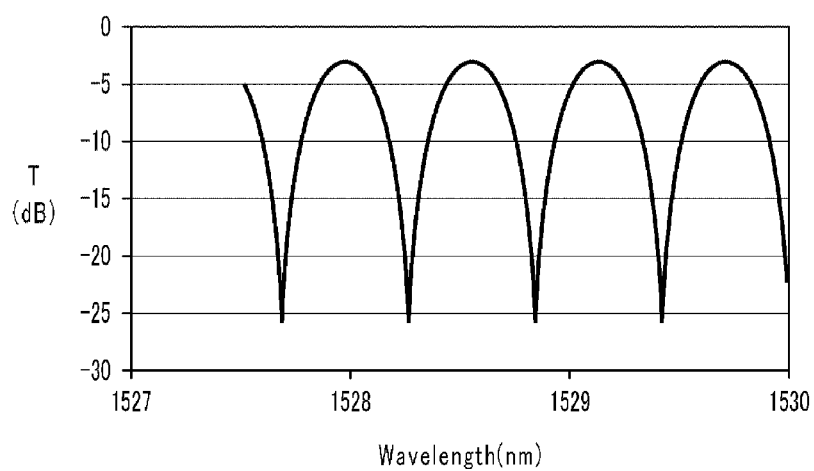

FIG. 2(a) is a schematic diagram showing a configuration of an athermal MZI 20, and FIG. 2(b) is a graph (b) showing a transmission spectrum of signal light transmitted through the athermal MZI 20. The horizontal axis of the graph in FIG. 2(b) represents a wavelength, and the vertical axis thereof represents a transmittance.

In the athermal MZI 20, a long arm side waveguide 22 and a short arm side waveguide 23 are arranged on a waveguide substrate 21.

The athermal MZI 20 is further provided with a groove 25 and resin 26 filled in the groove 25 on each of the short arm side and the long arm side. The short arm side waveguide 23 and the long arm side waveguide 22 are each arranged so as to pass through the resin 26, and at an input port side and an output port side interposing the grooves 25 filled with the resin 26, coupler portions 24 are formed, which are portions in which the long arm and the short arm are close to each other. The configuration including these elements is the one-chip athermal MZI 20.

There is a difference in a light traveling direction between the length of the groove 25 provided on the short arm side and the length of the groove 25 provided on the long arm side, and the length of the groove 25 in the light traveling direction is determined so as to satisfy the athermal conditions.

Light is input from a short arm side input port 27a and a long arm side input port 27b provided at one end of the athermal MZI 20. The light input from the short arm side input port 27a passes through the short arm side waveguide 23, passes through the resin 26 filled in the groove 25 on the short arm side, and is output from the short arm side output port 28a. Similarly, the light input from the long arm side input port 27b passes through the long arm side waveguide 22, passes through the resin 26 filled in the groove 25 on the long arm side, and is output from the long arm side output port 28b. At this time, the light passing through the short arm side waveguide 23 and the light passing through the long arm side waveguide 22 interfere in each of the coupler portions 24 at two positions.

As a result, the light output from the short arm side output port 28a and the long arm side output port 28b show a periodic transmission spectral shape as shown in FIG. 2(b). The wavelength varies for each chip due to an accuracy error of a mask and a variation in the refractive index of a glass or the resin 26. The athermal MZI used for optical communication, as in the case of the athermal AWG, needs to have its transmission wavelength exactly matched to the ITU grid.

(3) Athermal Ring Resonator

Figure 3:
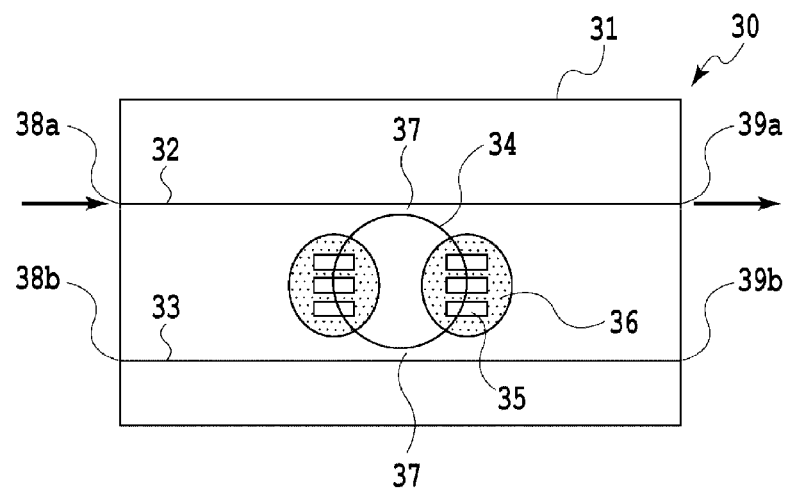
FIG. 3(a) is a schematic diagram showing a configuration of an athermal ring resonator.
FIG. 3(b) is a graph showing a transmission spectrum of signal light transmitted through the athermal ring resonator.
Figure 3:
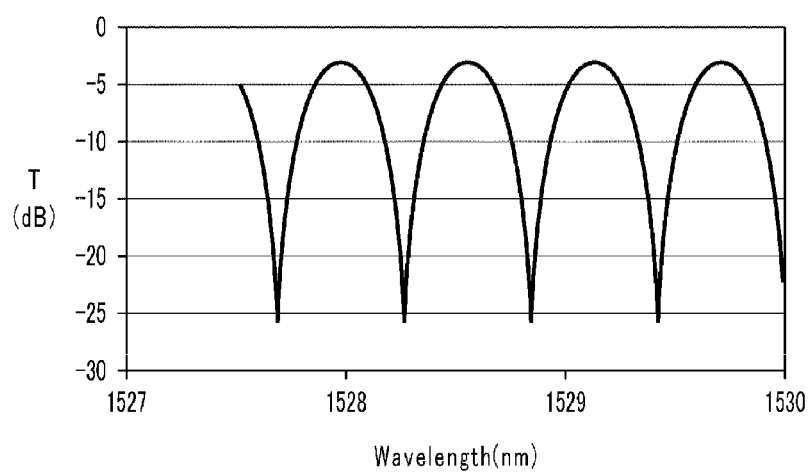

FIG. 3(a) is a schematic diagram showing a configuration of an athermal ring resonator, and FIG. 3(b) is a graph showing a transmission spectrum of signal light transmitted through the athermal ring resonator. The horizontal axis of the graph in FIG. 3(b) represents a wavelength, and the vertical axis thereof represents a transmittance.

In the athermal ring resonator 30, linear waveguides 32 and 33 and a ring waveguide 34 are arranged on a waveguide substrate 31. The linear waveguides 32 and 33 and the ring waveguide 34 form coupler portions 37 that are portions close to each other.

The athermal ring resonator 30 is further provided with, at a position through which the ring waveguide 34 passes, a groove 35 and resin 36 filled in the groove 35.

Light input to an input port 38a passes through the linear waveguide 32, and light input to an input port 38b passes through the linear waveguide 33, and these lights are output from the output ports 39a and 39b, respectively. While passing through one linear waveguide 32 or 33, the light partially or wholly moves to the other linear waveguide 32 or 33 at the coupler portion 37 and proceeds because excitation occurs due to an optical coupling phenomenon with the light passing through the ring waveguide 34. As a result, as shown in FIG. 3(b), the light output from the output port 39a or 39b shows a periodic transmission spectral shape in which the transmittance drops at the oscillation wavelength generated in the ring waveguide 34.

The linear waveguides 32 and 33 and the ring waveguide 34 are made of a quartz glass, and the temperature dependency of the refractive index thereof dn/dT (n represents a refractive index and T represents a temperature) has a positive value. On the other hand, the temperature dependency of the refractive index dn/dT of the resin 36 has a negative value. Here, by setting the ratio of the length of the ring waveguide 34 to the width of the groove 35 and the ratio of dn/dT of each of the quartz glass and the resin 36 to be equal, athermalization of the ring resonator can be achieved. As a result of this athermalization, it is possible to athermalize the transmission characteristics of the light transmitted through the athermal ring resonator 30.

(4) Athermal MZI Attached Athermal AWG

Figure 4:
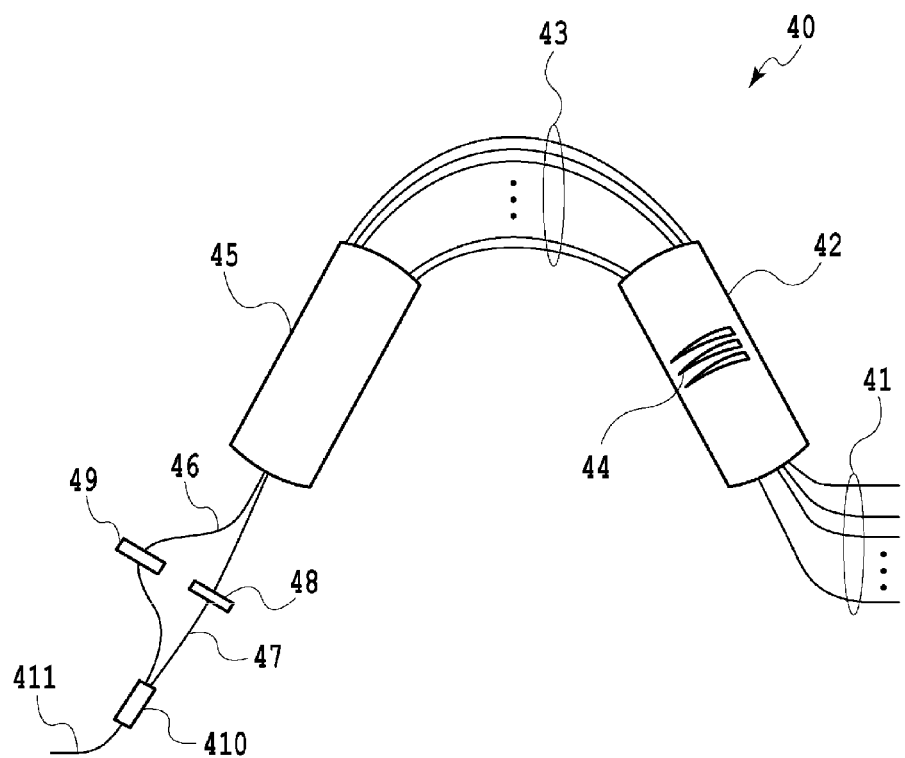
FIG. 4 is a schematic diagram showing a configuration of the athermal AWG provided with the MZI at an input side.

FIG. 4 is a schematic diagram showing a configuration of the athermal AWG provided with the MZI at an input side. This configuration is referred to herein as the "athermal MZI attached athermal AWG".

In an athermal MZI attached athermal AWG 40, an athermal MZI unit is connected to an input of an input side slab waveguide 45 of the athermal AWG unit. Here, in the configuration of the athermal MZI attached athermal AWG 40, the athermal AWG unit is provided with an input side slab waveguide 45, a phase shift channel waveguide 43, an output channel waveguide 41, an output side slab waveguide 42, and resin portion 44. The resin portion 44 is configured to include a groove and resin filled in the groove, and is arranged inside the output side slab waveguide 42.

Further, in the configuration of the athermal MZI attached athermal AWG 40, the athermal MZI unit is provided with a long arm side waveguide 46, resin portions 48 and 49, a short arm side waveguide 47, and a coupler port 410. Here, the resin portion is configured to include a groove and resin filled in the groove at each of the short arm side and the long arm side. The short arm side waveguide 47 and the long arm side waveguide 46 are arranged to pass through the resin portion 48 and the resin portion 49, respectively.

The athermal MZI attached athermal AWG 40 can make a tip portion of the transmission spectrum of the arrayed waveguide grating with the MZI into a flat (flat top) shape by matching the wavelength of the MZI with the wavelength of the A-AWG.

When light is input to the athermal MZI attached athermal AWG 40 from an input side waveguide 411 and is output from the output channel waveguide 41, and if the transmission wavelength of the athermal MZI unit and the transmission wavelength of the athermal AWG unit are exactly matched each other, the spectral shape of the output light is not a Gaussian shape, but a rectangular shape with the spectrum having a flat tip portion (flat top). For this reason, it is necessary to adjust the transmission wavelength from the athermal MZI unit so that the transmission wavelength from the athermal AWG unit matches the ITU grid and further the tip portion of the spectrum of the light transmitted from the athermal MZI unit is flat.

(Embodiment 1) Adjustment of the Transmission Wavelength from the Athermal MZI by Irradiation of Blue Light (Adjustment of a Long-Wave Side Shift and Short-Wave Side Shift)

FIG. 5(a) is a schematic diagram of an optical circuit configuration when signal light and blue light are simultaneously input to an athermal MZI 50 to adjust a transmission wavelength of the signal light, and FIG. 5(c) is a graph showing a spectrum of a transmission light transmitted through the athermal MZI. FIG. 5(b) is an enlarged view of a portion of FIG. 5(a). The horizontal axis of the graph in FIG. 5(c) represents a wavelength, and the vertical axis thereof represents a transmittance.

The configuration of the athermal MZI 50 is a configuration in which a blue light short arm side waveguide 54 and a blue light long arm side waveguide 55 are added to the configuration of the athermal MZI 20 shown in FIG. 2(a).

The grooves 25 are provided on the long arm side and the short arm side of the athermal MZI 50, and silicone resin as the resin 26 is filled in the grooves 25. The width of the groove 25 is set in such a manner that the wavelength of the signal light transmitted through the athermal MZI 50 is independent of the temperature.

The light sources of the light to be input to the athermal MZI 50 are a laser light source with a fiber (output wavelength: 405 nm) (hereinafter, referred to as the 405 nm laser light source) 51 and an ASE white light source with a fiber (output wavelength: 1550 nm) (hereinafter, referred to as the 1550 nm laser light source) 52. In the present embodiment, the 1550 nm laser light source 52 is used as a light source of signal light, and the 405 nm laser light source 51 is used as a light source of blue light for adjusting the refractive index.

Further, in the present embodiment, signal light and blue light are passed through a 3 dB coupler 53 for a communication wavelength band and are input to the athermal MZI 50. As a material of a core of the 3 dB coupler 53, a pure silica is desirably used. In this regard, the pure silica means a quartz ($SiO_2$) that does not contain a rare earth element serving as an emission center. This is because, if a coupler having a germanium (Ge)-doped core as the core of the 3 dB coupler 53 is used, a photodarkening phenomenon occurs due to the passage of the blue light, resulting in an increased intensity loss of the signal light. As in a case of the core of the 3 dB coupler 53, it is preferable that the waveguide provided in the athermal MZI 50 is a waveguide having a core of a pure silica, and it is particularly preferable that the core of the optical waveguide in a portion through which the blue light and the signal light pass simultaneously is a core of a pure silica.

First, the blue light emitted from the 405 nm laser light source 51 and the signal light emitted from the 1550 nm laser light source 52 are respectively input to the 3 dB coupler 53 and multiplexed into one fiber. The light multiplexed by the 3 dB coupler 53 is input to the short arm side input port 27a. When the blue light emitted from the 405 nm laser light source 51 is input to the 3 dB coupler 53, it passes through the 3 dB coupler 53 in a multimode and in a propagation mode without branching, and is input to the short arm side input port 27a. On the other hand, the signal light emitted from the 1550 nm laser light source 52 is branched into two at a ratio of 5:5, that is, with an equal light intensity, and is input to the short arm side input port 27*a* and the long arm side input port 27*b* of the athermal MZI 50.

The blue light input to the athermal MZI 50 travels straight through the short arm side waveguide of the athermal MZI and is output from the short arm side output port 28*a*. On the other hand, the signal lights of 1550 nm input from the short arm side input port 27*a* and the long arm side input port 27*b* cause interference inside the athermal MZI 50, and are output from the short arm side output port 28*a* and the long arm side output port 28*b*. Here, when the signal light output from the long arm side output port 28*b* is analyzed by a spectrum analyzer, the light has a periodic transmission spectral shape as shown in FIG. 5(*c*).

Further, it is observed that this transmission spectrum shifts to a short-wave side. This is because when the blue light passes through the groove 25 filled with the resin 26, the resin 26 is irradiated with the blue light, and as a result, the refractive index of the resin 26 increases.

Next, a port for inputting light to the athermal MZI 50 is switched from the short arm side input port 27*a* to the long arm side input port 27*b*, and blue light is input to the long arm side. As in a case in which the light is input to the short arm side input port 27*a*, when the blue light emitted from the 405 nm laser light source 51 is input to the 3 dB coupler 53, the blue light propagates through the 3 dB coupler 53 in a multimode, passes through it without branching, and is input to the long arm side input port 27*b*. On the other hand, the signal light emitted from the 1550 nm laser light source is branched into two with an equal light intensity and is input to the short arm side input port 27*a* and the long arm side input port 27*b* of the athermal MZI 50.

Figure 5:
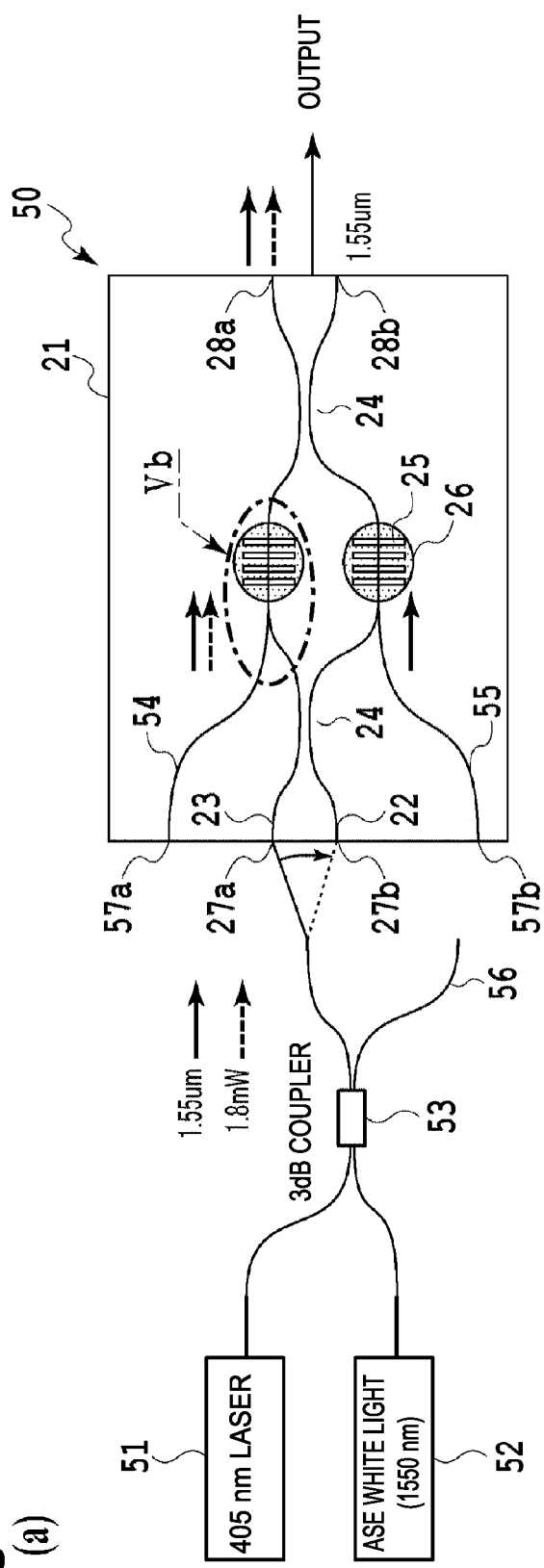
FIG. 5(a) is a schematic diagram of an optical circuit configuration when signal light and blue light are simultaneously input to an athermal MZI to adjust a transmission wavelength of the signal light.
FIG. 5(c) is a graph showing a spectrum of a transmission light transmitted through the athermal MZI.
FIG. 5(b) is an enlarged view of a portion of FIG. 5(a).
Figure 5:
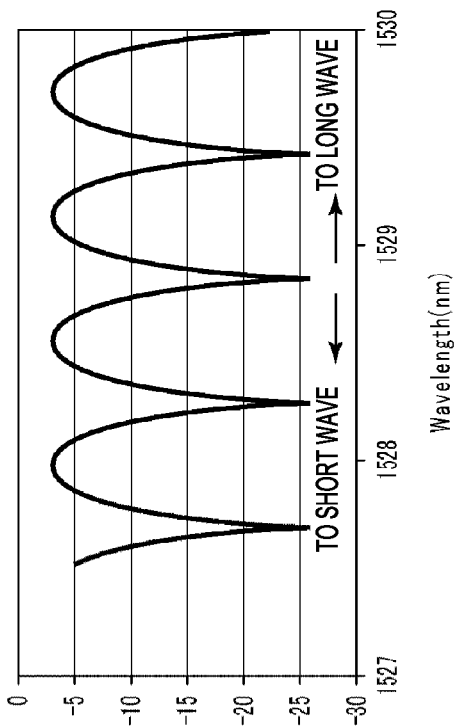
Figure 5:
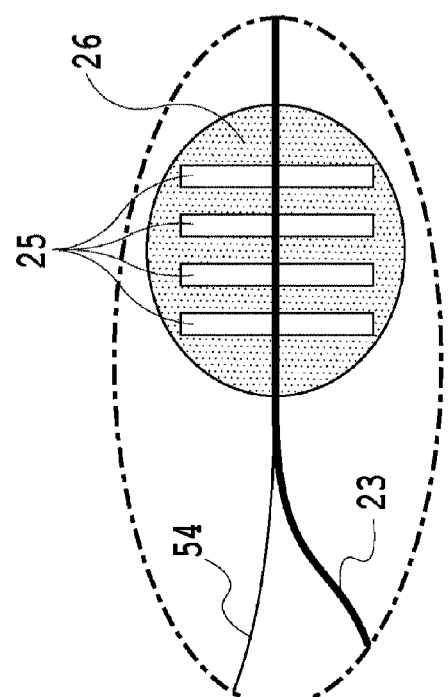

When the signal light output from the short arm side output port 28*a* is analyzed by a spectrum analyzer, the signal light has a periodic transmission spectral shape as shown in FIG. 5(*c*). This transmission spectrum shifts to a long-wave side, contrary to the case in which the light is input from the short arm side input port 27*a*.

Figure 6:
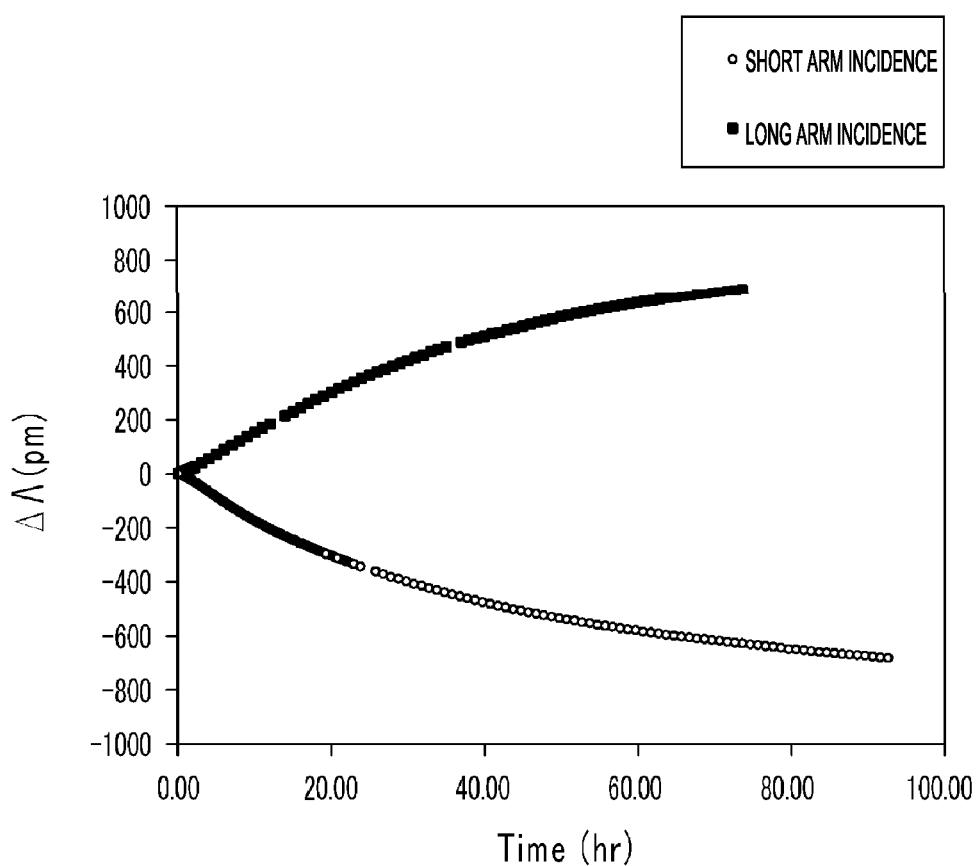
FIG. 6 is a graph showing a change, with respect to time, in the transmission wavelength of the signal light transmitted through the athermal MZI 50 shown in FIG. 5.

FIG. 6 is a graph showing a change, with respect to time, in the transmission wavelength of the signal light transmitted through the athermal MZI 50 shown in FIG. 5. The horizontal axis represents an irradiation time of the blue light to the resin 26, and the vertical axis thereof represents a shift amount of the transmission wavelength of the signal light. The black circle plot shows a value when the blue light is input to the long arm side input port 27*b*, and the white circle plot shows a value when the blue light is input to the short arm side input port 27*a*. At this time, the output of the 405 nm laser light source 51 is 1.8 mW. The temperature of the optical waveguide constituting the athermal MZI 50 is 25° C.

As shown in FIG. 6, it is revealed that the transmission wavelength of the signal light can be shifted to the short-wave side when blue light is input to the short arm side, and the transmission wavelength of the signal light can be shifted to the long-wave side when blue light is input to the long arm side. That is, in the athermal MZI 50, by inputting the blue light to the short arm side or the long arm side, wavelength adjustment is possible in which the transmission wavelength of the signal light is shifted to the short-wave side or the long-wave side.

Here, when the output of the 405 nm laser light source 51 was increased to 50 mW, the wavelength of the signal light was able to be shifted to the short-wave side by 100 pm in several minutes. From the results shown in FIG. 6, when the output of the 405 nm laser light source 51 is 1.8 mW, it takes about 10 minutes to shift the transmission wavelength of the signal light to the short-wave side by 100 pm.

Further, the output of the 405 nm laser light source 51 was further increased to 100 mW, and as a result of wavelength adjustment by additionally setting the temperature of the optical waveguide constituting the athermal MZI 50 to 60° C. in advance before inputting the signal light and the blue light to the athermal MZI 50, it was possible to shift the transmission wavelength to the long-wave side by 400 pm in about 10 minutes. From the results shown in FIG. 6, when the output of the 405 nm laser light source 51 is 1.8 mW and the temperature of the optical waveguide constituting the athermal MZI 50 is 60° C., it takes about minutes to shift the transmission wavelength of the signal light to the long-wave side by 400 pm.

That is, according to the present embodiment, as the output of the light source of the blue light increases, the time required to shift the transmission wavelength of the signal light becomes shorter, that is, the wavelength can be adjusted more quickly. Further, similarly, as the temperature of the optical waveguide constituting the athermal MZI 50 rises, the time required to shift the transmission wavelength of the signal light becomes shorter, that is, the wavelength can be adjusted more quickly.

Further, in the above example, the blue light is also passed simultaneously through the optical waveguide through which the signal light passes, but the intensity loss of the signal light may be increased by the passage of the blue light in the optical waveguide, that is, the irradiation of the blue light to the core of the optical waveguide. In this case, it is preferable to separately provide, to the athermal MZI, an optical waveguide for inputting only blue light.

In the athermal MZI 50, the blue light short arm side waveguide 54 and the blue light long arm side waveguide 55 are optical waveguides for irradiating the resin 26 filled in the groove 25 with the blue light. By being provided with the blue light short arm side waveguide 54 and the blue light long arm side waveguide 55, in a region closer to the input side than the groove 25 filled with the resin 26, the blue light passes through the blue light short arm side waveguide 54 or the blue light long arm side waveguide 55, and the signal light passes through the short arm side waveguide 23 or the long arm side waveguide 22.

FIG. 5(*b*) is an enlarged view of a portion surrounded by the alternate long and short dashed line in FIG. 5(*a*). The diameter of the core of the blue light short arm side waveguide 54 is smaller than the diameter of the core of the short arm side waveguide 23, and specifically, is one third of the diameter of the core of the short arm side waveguide 23. It is not possible to input signal light to the blue light short arm side waveguide 54, nor to pass the signal light through the blue light short arm side waveguide 54. That is, when the blue light short arm side waveguide 54 is provided, the signal light can pass through the short arm side waveguide 23 and the resin 26 filled in the groove 25 without being affected by irradiation of the blue light. On the other hand, by changing the input port and by passing blue light through the provided blue light short arm side waveguide 54 prior to reaching the groove 25, the resin 26 filled in the groove 25 can be irradiated with the blue light. At this time, the configuration of the optical waveguide posterior to passing through the groove 25 is the same regardless of whether the blue light short arm side waveguide 54 is provided.

That is, by being provided with the blue light short arm side waveguide 54 and the blue light long arm side waveguide 55, the athermal MZI 50 can suppress an increase in the intensity loss of the signal light without changing the configuration of the optical waveguide posterior to the groove 25 filled with the resin 26.

Figure 7A:
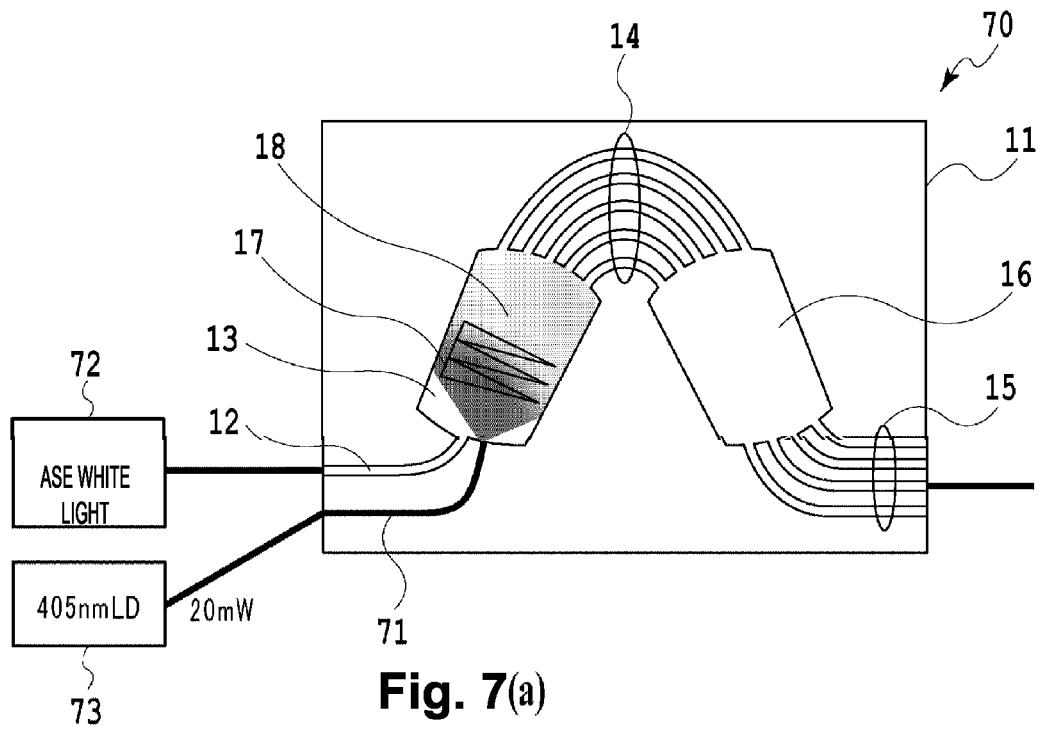
FIG. 7(a) is a schematic diagram of an optical circuit configuration when signal light and blue light are simultaneously input to an athermal AWG to adjust a transmission wavelength of the signal light, and FIG. 7 (b) is a graph showing a transmission spectrum of the signal light transmitted through the athermal MZI.
Figure 7B:
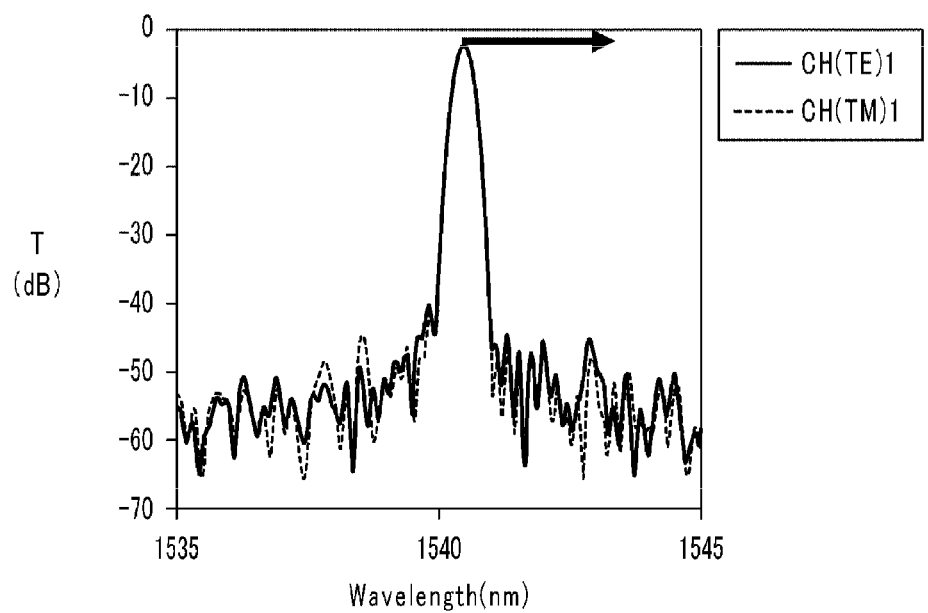

(Embodiment 2) Adjustment of the Transmission Wavelength from the Athermal AWG by Irradiation of Blue Light FIG. 7(*a*) is a schematic diagram of an optical circuit configuration when signal light and blue light are simultaneously input to an athermal AWG 70 to adjust a transmission wavelength of the signal light, and FIG. 7(*b*) is a graph showing a transmission spectrum of the signal light transmitted through the athermal MZI. The horizontal axis of the graph in FIG. 7(*b*) represents a wavelength, and the vertical axis thereof represents a transmittance. Further, in FIG. 7(*b*), the solid line represents the transmittance of a horizontally polarized wave component, and the dotted line represents the transmittance of a vertically polarized wave component.

The configuration of the athermal AWG 70 is a configuration in which a blue light input side waveguide 71 is added to the configuration of the athermal AWG 10 shown in FIG. 1(*a*). The blue light input side waveguide 71 is separated from the input channel waveguide 12, and is an optical waveguide for passing only blue light and irradiating the resin 18 filled in the groove 17 with the blue light. In the present embodiment, the resin 18 is silicone resin.

The light sources of the light to be input to the athermal AWG 70 is a 405 nm laser light source 73 and a 1550 nm laser light source 72. In the present embodiment, the 1550 nm laser light source 72 is used as a light source of signal light, and the 405 nm laser light source 73 is used as a light source of blue light for adjusting the refractive index.

First, the signal light emitted from the 1550 nm laser light source 72 is input to the input channel waveguide 12 via a fiber. Similarly, the blue light emitted from the 405 nm laser light source 73 is input to the blue light input side waveguide 71 via a fiber. When the blue light that has passed through the blue light input side waveguide 71 reaches the input side slab waveguide 13, it spreads radially and irradiates the resin 18 filled in the groove 17, thereby changing the refractive index of the resin 18. Therefore, the refractive index of the resin 18 filled in the groove 17, which is located at a portion through which the signal light passes for each wavelength, changes.

Figure 8:
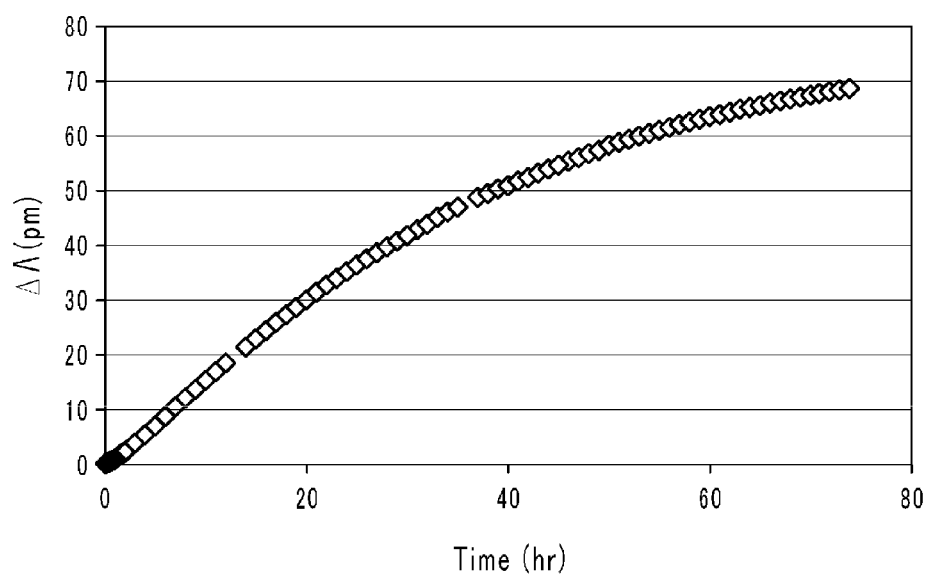
FIG. 8 is a graph showing a change, with respect to time, in the transmission wavelength of the signal light transmitted through the athermal AWG 70 shown in FIG. 7.

FIG. 8 is a graph showing a change in the transmission wavelength of the signal light transmitted through the athermal AWG 70 shown in FIG. 7 with respect to irradiation time of the blue light. The horizontal axis represents the irradiation time of the blue light to the resin 18, and the vertical axis represents a shift amount of the transmission wavelength of the signal light. At this time, the output of the 405 nm laser light source 73 is 18 mW.

Whether the transmission wavelength of the signal light shifts to the short-wave side or the long-wave side is determined by the type of the resin 18 filled in the groove 25. Generally, in the case in which silicone resin is employed as the resin 18, and when the silicone resin is irradiated with blue light, the refractive index thereof increases, according to which the transmission wavelength of the signal light shifts to the long-wave side. Further, in the case in which acrylic resin is employed as the resin 18, the refractive index thereof decreases and the transmission wavelength of the signal light shifts to the short-wave side.

As shown in FIG. 8, the transmission wavelength of the signal light shifts monotonously to the long-wave side with respect to the irradiation time of the blue light to the resin 18.

It should be noted that the shift amount is smaller than the shift amount of the transmission wavelength from the athermal MZI 50 in the first embodiment because in the configuration of the athermal AWG 70, the blue light radially spreads in the input side slab waveguide 13, which weakens the power density of the blue light emitted to the resin 18 filled in the groove 17 compared with the case in the configuration of the athermal MZI 50.

(Embodiment 3) Adjustment of the Transmission Wavelength from the Athermal Ring Resonator by Irradiation of Blue Light When an athermal ring resonator 30 is used in place of the athermal AWG 70 under the same conditions as in the second embodiment, the transmission wavelength of the signal light was able to be adjusted in the same manner as in the second embodiment.

(Embodiment 4) Athermal MZI Attached Athermal AWG

Figure 9A:
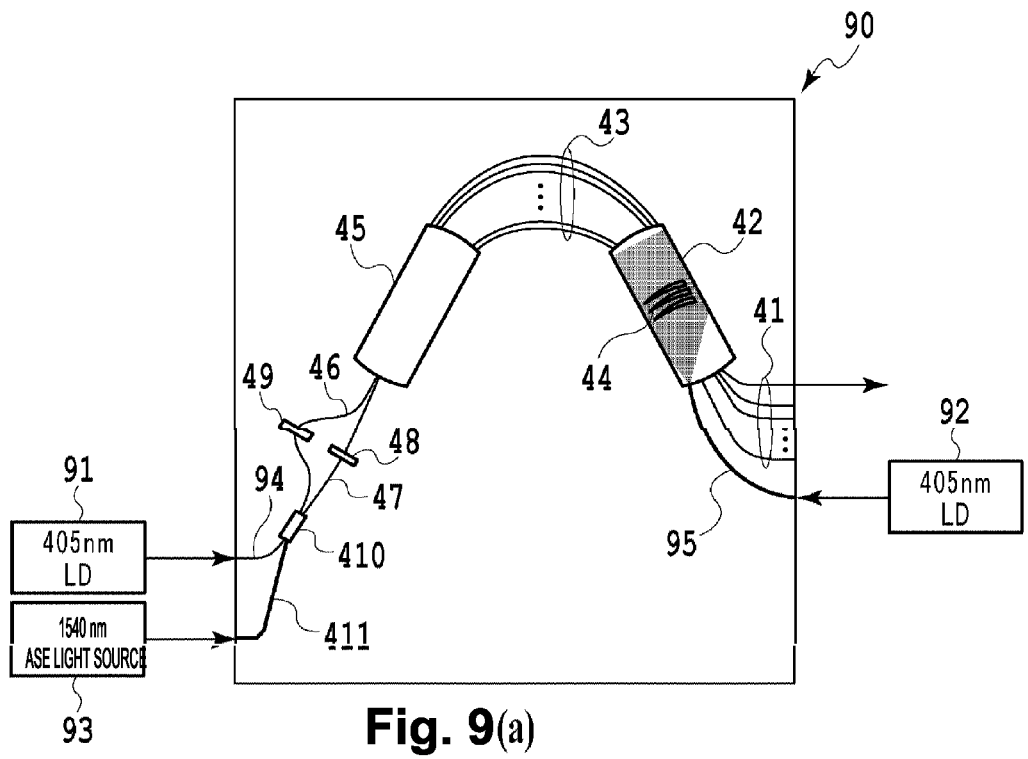
FIG. 9(a) is a schematic diagram of an optical circuit configuration when signal light and blue light are simultaneously input to an athermal MZI attached athermal AWG 90 in which the athermal MZI is connected to an input side of the athermal AWG to adjust a transmission wavelength of the signal light.

FIG. 9(*a*) is a schematic diagram of an optical circuit configuration when signal light and blue light are simultaneously input to an athermal MZI attached athermal AWG 90 in which the athermal MZI is connected to an input side of the athermal AWG to adjust a transmission wavelength of the signal light, and FIG. 9(*b*) is a schematic diagram (b) showing a transmission spectrum of the signal light transmitted through the athermal MZI attached athermal AWG 90. In FIG. 9(*b*), a dotted line 96 is a transmission spectrum of the signal light after the resin portion 44 in the output side slab waveguide 42 is irradiated with the blue light, and a solid line 97 shows a transmission spectrum of the signal light subsequently after the resin portions 48 and 49 in the athermal MZI unit are irradiated with the blue light.

The configuration of the athermal MZI attached athermal AWG is a configuration in which blue light input side waveguides 94 and 95 are added to the configuration of the athermal MZI attached athermal AWG 40 shown in FIG. 4. The blue light input side waveguides 94 and 95 are optical waveguides for passing only blue light and irradiating resin of the resin portions 44, 48, and 49 with the blue light. In the present embodiment, the resin of the resin portions 44, 48, and 49 is silicone resin.

The blue light input side waveguide 94 is separated from the input side waveguide 411 and is connected to the coupler 410 located on an input side of the athermal MZI attached athermal AWG 90. The blue light input side waveguide 95 is separated from the output channel waveguide 41, and is connected to the output side slab waveguide 42 located on an output side of the athermal MZI attached athermal AWG 90.

The light sources of the light to be input to the athermal MZI attached athermal AWG 90 are a 405 nm laser light sources 91 and 92 and a 1550 nm laser light source 93. In the present embodiment, the 1550 nm laser light source 93 is used as a light source of signal light, and the 405 nm laser light sources 91 and 92 are used as light sources of blue light for adjusting the refractive index. The blue light emitted from the 405 nm laser light source 91 is input to the blue light input side waveguide 94, and the blue light emitted from the 405 nm laser light source 92 is input to the blue light input side waveguide 95.

First, the blue light emitted from the 405 nm laser light source 92 is passed through the blue light input side waveguide 95 and is input to the output side slab waveguide 42.

Figure 9B:
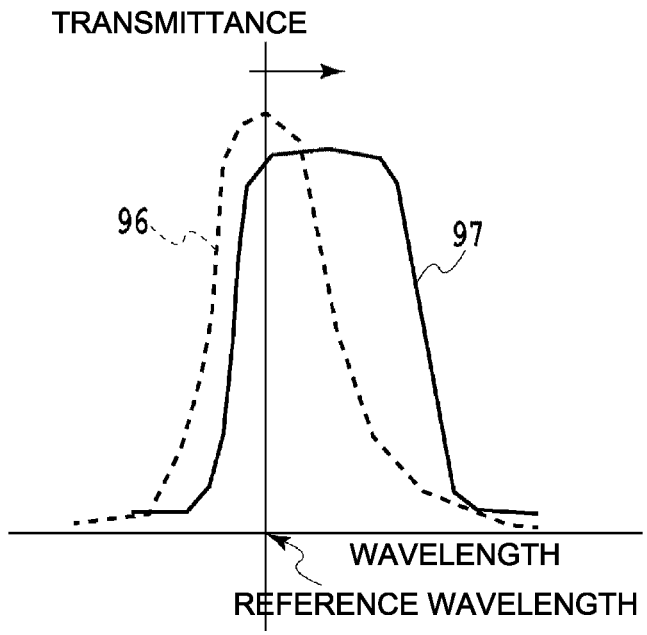
FIG. 9(b) is a schematic diagram showing a transmission spectrum of the signal light transmitted through the athermal MZI attached athermal AWG 90.

At this time, the resin of the resin portion 44 is irradiated with the input blue light in the output side slab waveguide 42, and the refractive index of the resin of the resin portion 44 changes accordingly. Here, the refractive index of the resin of the resin portion 44 is adjusted so that the center wavelength of the transmission spectrum of the signal light, which is output from the output channel waveguide 41 after the signal light is input, matches the ITU grid. At this time, the shape of the transmission spectrum of the signal light is a Gaussian shape 96 as shown in FIG. 9(b), and the center wavelength thereof and the reference wavelength, that is, the ITU grid are to be matched.

Next, the blue light emitted from the 405 nm laser light source 91 is passed through the blue light input side waveguide 94 and is input to the resin portions 48 and 49. At this time, the resin of the resin portions 48 and 49 are irradiated with the input blue light, and the refractive index of the resin of the resin portions 48 and 49 changes accordingly. Here, the refractive index of the resin of the resin portions 48 and 49 is adjusted so that the shape of the transmission spectrum of the signal light output from the output channel waveguide 41 after the signal light is input is changed from the Gaussian shape 96 to a rectangular shape 97.

In the present embodiment, the output of the 405 nm laser light source 91 is set lower compared with the output of the 405 nm laser light source 92, and specifically, is about 1/10 of the output of the 405 nm laser light source 92. Therefore, when adjusting the refractive index of the resin of the resin portions 48 and 49, the blue light emitted from the 405 nm laser light source 91 cannot reach the resin portion 44 in the output side slab waveguide 42, or even if the blue light reaches the resin portion 44, the intensity is lower than the intensity sufficient to change the refractive index of the resin of the resin portion 44. In other words, the refractive index of the resin of the resin portion 44 whose refractive index has been once adjusted by being irradiated with the blue light emitted from the 405 nm laser light source 92 does not change when the blue light emitted from the 405 nm laser light source 91 is input to the athermal MZI attached athermal AWG 90. That is, it is not necessary to readjust the refractive index of the resin of the resin portion 44 by inputting the blue light emitted from the 405 nm laser light sources 91 and 92 to the athermal MZI attached athermal AWG 90 in the order described above.

Figure 10:
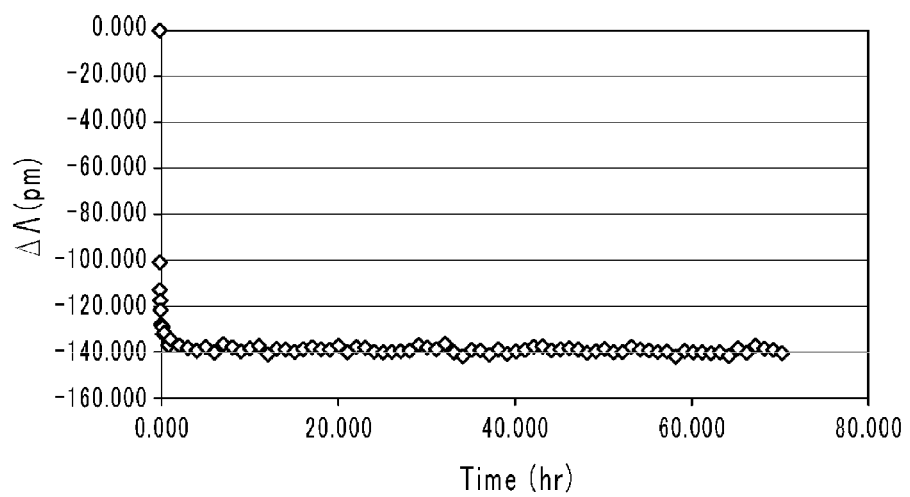
FIG. 10 is a graph showing a change in a transmission wavelength shift amount of signal light with respect to signal light input time when a high-power signal light is input from a short arm side input port 27a of the athermal MZI 20.

(Embodiment 5) Method for Restoring the Transmission Wavelength when the Transmission Wavelength of the Signal Light Shifts to the Short-Wave Side Due to an Input of a High-Power Signal Light to the Optical Waveguide Device FIG. 10 is a graph showing a change in a transmission wavelength shift amount of signal light with respect to signal light input time when a high-power signal light is input from the short arm side input port 27a of the athermal MZI 20. The horizontal axis represents the signal light input time to the athermal MZI 20, and the vertical axis thereof represents the shift amount of the transmission wavelength of the signal light. The output of the light source of the signal light is 200 mW.

When signal light having a light source output of 200 mW is input from the short arm side input port 27a of the athermal MZI 20, the transmission wavelength of the signal light instantaneously shifts to the short-wave side by about 70 pm. As the input time of the signal light to the athermal MZI 20 increases, the shift amount of the transmission wavelength of the signal light to the short-wave side gradu-ally increases, and the shift amount of the transmission wavelength of the signal light to the short-wave side reaches about 140 pm at the maximum, where it is saturated. Compared to the ITU grid interval that is set to 400 pm, the shift amount of the transmission wavelength of the signal light to the short-wave side is large, and thus is not preferable.

In the present embodiment, a method will be described in which the transmission wavelength of the signal light, which has shifted to the short-wave side, is restored to the original transmission wavelength by inputting blue light to the athermal MZI 20.

Figure 11A:
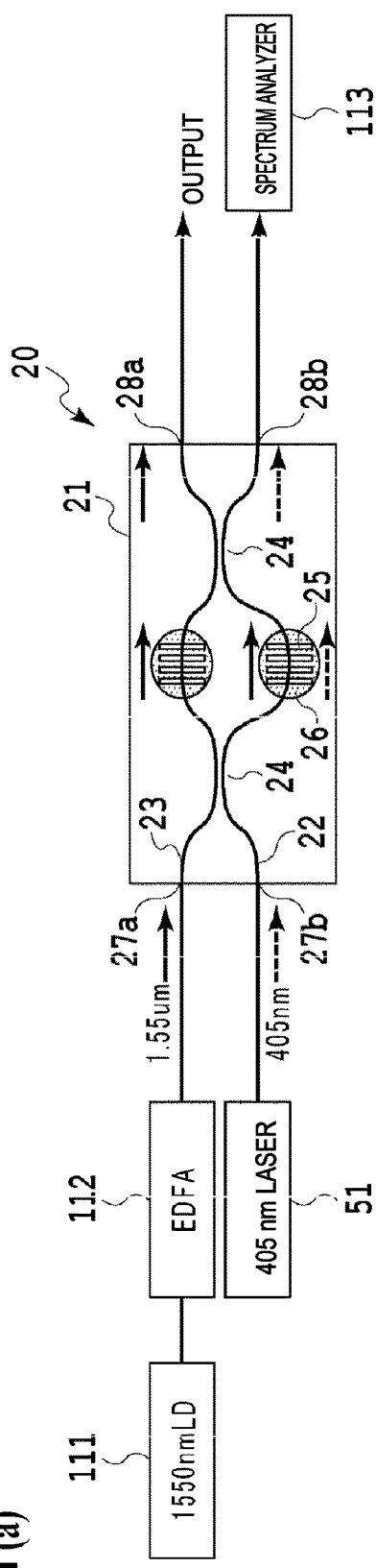
FIG. 11(a) is a schematic diagram of an optical circuit configuration when signal light and blue light are simultaneously input to the athermal MZI 20 to readjust the transmission wavelength of the signal light that has shifted from a reference wavelength.
Figure 11B:
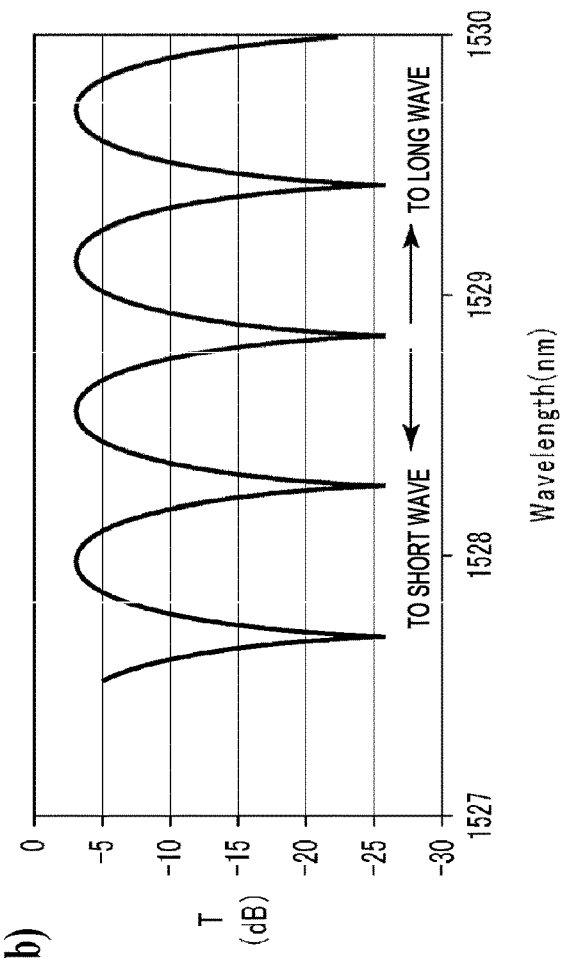
FIG. 11(b) is a graph showing a transmission spectrum of the signal light transmitted through the athermal MZI 20.

FIG. 11(a) is a schematic diagram of an optical circuit configuration when signal light and blue light are simultaneously input to the athermal MZI 20 to readjust the transmission wavelength of the signal light that has shifted from a reference wavelength, and FIG. 11(b) is a graph showing a transmission spectrum of the signal light transmitted through the athermal MZI 20. The horizontal axis of the graph in FIG. 11(b) represents a wavelength, and the vertical axis thereof represents a transmittance.

The light sources of the light to be input to the athermal MZI 20 are the 405 nm laser light source 51 and a 1550 nm laser light source 111. In the present embodiment, the 1550 nm laser light source 111 is used as a light source of signal light, and the 405 nm laser light source 51 is used as a light source of blue light for adjusting the refractive index.

First, with the signal light emitted from the high-power 1550 nm laser light source 111 being input to the short arm side input port 27a of the athermal MZI 20, the blue light emitted from the 405 nm laser light source 51 (output: several mW) is input to the long arm side input port 27b.

The high-power signal light passes through an erbium doped optical fiber amplifier (hereinafter, referred to as the EDFA), is input to the athermal MZI 20, and is output from the short arm side output port 28a. At this time, the signal light that has passed through the EDFA contains wavelengths of spontaneous emission light and/or stimulated emission light generated in the EDFA, in addition to the wavelength of the signal light emitted from the 1550 nm laser light source 111. Therefore, when wavelengths other than 1550 nm of the transmission wavelengths of the signal light output from the long arm side output port 28b are measured by the spectrum analyzer, the transmission spectrum of the signal light transmitted through the athermal MZI 20 can be observed.

After blue light is input from the long arm side input port 27b and the resin 26 filled in the groove 25 through which the long arm side waveguide 22 passes is irradiated with the blue light to change the refractive index of the resin 26, and while monitoring that wavelengths other than 1550 nm of the transmission wavelengths of the signal light output from the long arm side output port 28b are shifting to the long-wave side, the input of the blue light to the athermal MZI 20 is stopped when the transmission wavelength of the signal light output from the long arm side output port 28b and the ITU grid match each other.

Further, in addition to inputting the signal light emitted from the high-power light source as described above, when signal light emitted from a light source having 10 mW or less, which is an ordinary power, is input, and if the input is carried out continuously for a long time, the transmission wavelength of the signal light shifts to the short-wave side or the long-wave side. For example, if the athermal MZI is used for 10 to 20 years, the transmission wavelength of the signal light may shift by several tens of pm at the maximum.

According to the embodiment of the present invention, if the transmission wavelength of the signal light that has passed through the athermal MZI largely shifts, the transmission wavelength of the signal light can be restored to the original transmission wavelength only by the procedure described below without changing the athermal MZI to a new one. The procedure is to input the blue light to the short arm side or the long arm side of the athermal MZI, thereby adjusting the refractive index of the resin filled in the groove.

REFERENCE SIGNS LIST 10, 70 Athermal AWGs
11 Quartz substrate
12 Input channel waveguide
13, 45 Input side slab waveguides
14, 43 Phase shift channel waveguides
15, 41 Output channel waveguides
16, 42 Output side slab waveguides
17, 25, 35 Grooves
18, 26, 36 Resin
20, 50 Athermal MZIs
21, 31 Waveguide substrates
22, 46 Long arm side waveguides
23, 47 Short arm side waveguides
24, 37 Coupler portions
27a Short arm side input port
27b Long arm side input port
28a Short arm side output port
28b Long arm side output port
30 Athermal ring resonator
32, 33 Linear waveguides
34 Ring waveguide
38a, 38b Input ports
39a, 39b Output ports
40, 90 Athermal MZI attached athermal AWGs
44, 48, 49 Resin portions
410 Coupler
411 Input side waveguide
51, 73, 91, 92 405 nm laser light sources
52, 72, 93 ASE white light sources
53 3 dB coupler
54 Blue light short arm side waveguide
55 Blue light long arm side waveguide
57a Blue light short arm side input port
57b Blue light long arm side input port
71, 94, 95 Blue light input side waveguides
96 Gaussian shape spectrum
97 Rectangular shape spectrum
111 1550 nm laser light source
112 EDFA
113 Spectrum analyzer

The invention claimed is:

1. A method for adjusting a transmission wavelength of signal light transmitted through an optical waveguide device that is provided with one or more optical waveguides through which the signal light having a wavelength of 1520 nm to 1560 nm and blue light having a wavelength of 375 nm to 455 nm pass, a groove through which the optical waveguide passes, and resin filled in the groove, comprising:

a step of entering the signal light and the blue light into the same or mutually different resin via the same or mutually different one or more optical waveguides, the step being a step of changing a refractive index of the resin by irradiating the resin with the blue light so as to change the transmission wavelength of the signal light transmitted through the resin in accordance with a change in the refractive index of the resin; and a step of adjusting a speed at which the transmission wavelength of the signal light passing through the resin changes in accordance with a change in the refractive index of the resin such that a time required to shift the transmission wavelength of the signal light becomes shorter by adjusting an output of a light source for blue light that generates the blue light.

2. The method for adjusting a transmission wavelength of signal light transmitted through an optical waveguide device according to claim 1, wherein the optical waveguide device is an arrayed waveguide grating, a Mach-Zehnder interferometer, a ring resonator, or a combination thereof.

3. The method for adjusting a transmission wavelength of signal light transmitted through an optical waveguide device according to claim 1, wherein the one or more optical waveguides are made of only quartz, and in the step of passing the resin, the signal light and the blue light are entered into the same or mutually different resin via the same one or more optical waveguides.

4. The method for adjusting a transmission wavelength of signal light transmitted through an optical waveguide device according to claim 1, wherein the resin is optical resin, and is an organic.

5. The method for adjusting a transmission wavelength of signal light transmitted through an optical waveguide device according to claim 1, further comprising a step of adjusting a temperature of the one or more optical waveguides before the step of entering the signal light and the blue light into the same or mutually different resin via the same or mutually different one or more optical waveguides.

6. The method for adjusting a transmission wavelength of signal light transmitted through an optical waveguide device according to claim 1, further comprising a step of changing the refractive index of the resin while monitoring the change in the transmission wavelength of the signal light transmitted through the resin so as to stop inputting of the blue light in the optical waveguide device when the transmission wavelength matches a predetermined reference value.

7. The method for adjusting a transmission wavelength of signal light transmitted through an optical waveguide device according to claim 1, wherein the resin includes a first resin and a second resin disposed at two positions in the optical waveguide device, and further comprising:

a step of changing, firstly, a refractive index of the first resin by irradiating the first resin with the blue light, and a step of changing, subsequently, a refractive index of the second resin by irradiating the second resin with the blue light, wherein a power of the blue light irradiating the second resin is lower than a power of the blue light irradiating the first resin.

8. The method for adjusting a transmission wavelength of signal light transmitted through an optical waveguide device according to claim 4, wherein the resin is silicone resin, acrylic resin, polyethylene, ethylene-vinyl acetate copolymer, ethylene-acrylate copolymer, polyisobutylene, ethylene-propylene rubber, chlorosulfonated polyethylene rubber, chlorinated polyethylene rubber, polypropylene, polybutadiene rubber, styrene-butadiene block rubber, styrene polyolefin rubber, fluorinated gel, fluororubber, or a combination thereof.

* * * * *